Patented May 7, 1940

2,199,806

UNITED STATES PATENT OFFICE 2,199,806

WETTING, CLEANING, AND EMULSIFYING AGENT

Robert W. Mitchell, Westfield, N. J., assignor to Magnus Chemical Company, Garwood, N. J., a corporation of New York No Drawing. Application January 23, 1936, Serial No. 60,455

10 Claims. (Cl. 260—505)

The present invention relates to wetting, cleansing and emulsifying agents, and comprises a new product of this class which may be readily and economically prepared and has new and valuable cleansing, wetting, emulsifying and foaming properties. A type of wetting agent now on the market is an aryl sulphonic acid with one or more of the nuclear hydrogens of the aryl group substituted by alkyl radicals. The alkyl radical may be obtained from an alcohol such as butyl alcohol, or from an olefin or a diolefin such as amylene or diamylene. The new product, while superficially resembling the type above generally described, actually differs radically therefrom in that the alkyl radical is not merely substituted for a nuclear hydrogen of the aryl groups, but apparently forms a link between two aryl groups with the result that the new product has vastly superior properties. The aryl groups between which the alkyl radical appears to act as a link may be like or unlike depending upon the particular characteristics desired in the final product and the specific uses to which it is to be put. The linking radical may be an alkyl as from an alcohol, such as butyl alcohol, or an olefin, either polymerized or not, such as di-isobutylene.

In preparing the new product one mol of olefin or polyolefin is condensed with two mols of an aryl compound such as naphthalene, or with one mol of each of two different aryl compounds, in the presence of concentrated sulphuric acid. The aryl compound or compounds may be previously, simultaneously, or subsequently sulphonated to a mono- or to a disulphonic acid by reaction with excess of concentrated sulphuric acid. Preferably condensation and sulphonation are effected simultaneously. As the reaction is exothermic, sufficient heat is generated to complete the reaction without application of external heat. For greater speed of reaction and for a somewhat more stable product heating to a temperature of approximately 115° C. is recommended. The final product may then be neutralized if desired, with an alkali, such as sodium hydroxide.

From the fact that the product obtained when the above proportions, namely, one mol of olefin to two mols of aryl compound are employed, differs in appearance, texture, color, odor, solubility, and also in its wetting and emulsifying properties from a product prepared from the same components but with different proportions during condensation, namely, one or more mols of olefin to one mol of aryl compound, and after condensation mixed with a second mol of aryl compound, leads to the belief that the new product is not a mixture of nuclear substituted aryl sulphonic acid with unsubstituted aryl sulphonic acid but is a true compound having a structure which may be represented as follows:

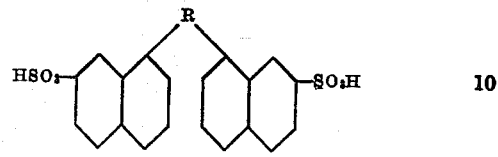

when R is the alkyl radical bridging two sulphonated naphthalene nuclei.

Similarly when one mol of olefin is condensed with two mols of diphenyl and after sulphonation and condensation, the product is neutralized, a valuable detergent is produced which may be represented as the salt of the following sulphonic acid:

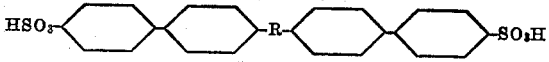

When one mol of olefin is condensed with one mol of naphthalene and one mol of diphenyl, the resulting product differs in its physical properties from a mixture of the two products, the formulae of which are represented above, and hence is believed at least to a considerable extent to be of the form—

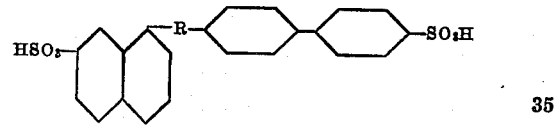

Specific examples illustrative of the invention are given below.

*Example I.*—One gram mol of di-isobutylene, two gram mols of naphthalene, 400 grams of monosulphuric acid and 150 grams of 20% fuming sulphuric acid are all mixed together and stirred vigorously; oxidation, condensation and sulphonation taking place simultaneously. Heating is not essential but, as heretofore indicated, the reaction is more rapid when the temperature is raised above 100° C. Upon the completion of the reaction, a light tan colored oil separates which is then decanted, washed, and neutralized with sodium or other hydroxide. Upon dehydration, the resulting product is a white powder which is substantially odorless. It has good wetting properties in acid, neutral or alkaline solution. It is soluble in 4% caustic soda solution.

*Example II.*—One gram mol hexyl alcohol, two gram mols naphthalene, 400 grams monosulphuric acid and 400 grams of 20% fuming sulphuric acid are mixed together and treated in the same way as in Example I. The resulting product before neutralization is a brown heavy liquid, insoluble in water. Upon neutralization a brown viscous paste results. Upon dehydration a tan powder results.

In each of the above examples, sulphonation and condensation is effected simultaneously as this is the simplest procedure, but insofar as the resulting product is concerned these reactions could as well be carried on successively in either order. In each example a single simple aryl compound is specified, but substitution products of the aryl compound could be used, or as previously indicated, equal parts of two different aryl compounds could be used.

In one example the compound from which the linking radical is formed is polymerized. As a matter of fact, it is relatively unimportant whether an olefin or a polymerized olefin is added to the initial mixture because under the conditions specified, namely the presence of concentrated sulphuric acid, polymerization will occur to a considerable extent and the resulting radical will be of a polymerized hydrocarbon. Similarly whether alcohol or olefin is employed is relatively unimportant because the alcohol in the presence of sulphuric acid will revert to the hydrocarbon by dehydration. Neutralization of the acid product has been suggested in each case. Neutralization is not essential, however, as the acid product itself is also a good wetting, cleansing and emulsifying agent. Where the agent is to be used for washing carbon black, for example, the acid form is preferred. For washing mineral pigments the neutralized agent is superior.

From the above description it will be apparent that the invention, broadly considered, comprises a new class of cleansing, wetting, emulsifying and foaming agents characterized by a linking of two aryl nuclei by a radical of an aliphatic compound such as olefin or alcoholic derivatives or homologues thereof.

As compared with wetting agents heretofore known, the new class of compounds requires for formation a ratio of one mol of olefin to two of aryl compound.

The following is claimed:

1. A wetting agent consisting essentially of the reaction product obtained when an aryl compound of the class consisting of naphthalene and diphenyl and an olefin of at least four carbon atoms per molecule in the proportions of two mols of the aryl compound to one mol of the olefin, are mixed together in the presence of monosulphuric and fuming sulphuric acids.

2. The wetting agent of claim 1 wherein the olefin is polymerized.

3. A product according to claim 1, wherein the aryl compound comprises naphthalene and diphenyl in equal proportions, the olefin serving as a bond between the naphthalene and diphenyl nuclei.

4. A wetting agent consisting essentially of the reaction product obtained when naphthalene and di-isobutylene in the proportions of two mols of naphthalene to one mol of di-isobutylene are mixed together in the presence of monosulphuric and fuming sulphuric acids.

5. A wetting agent according to claim 1 wherein the aryl compound is naphthalene.

6. A wetting agent having the formula

where R' is a radical derived from an aliphatic hydrocarbon of at least four carbon atoms of the class consisting of olefins and diolefins and R is any nuclear group of a sulphonated aryl compound of the class consisting of naphthalene and diphenyl.

7. A wetting agent having the formula

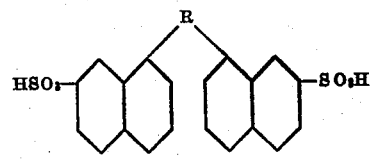

where R is a radical derived from an aliphatic hydrocarbon of at least four carbon atoms of the class consisting of olefins and diolefins.

8. A wetting agent having the formula

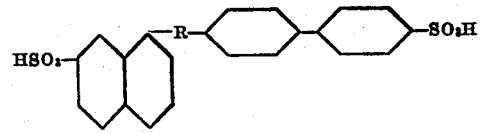

where R is a radical derived from an aliphatic hydrocarbon of at least four carbon atoms of the class consisting of olefins and diolefins.

9. A wetting agent having the formula

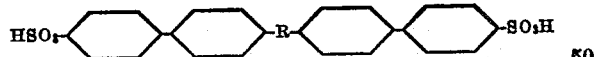

where R is a radical derived from an aliphatic hydrocarbon of at least four carbon atoms of the class consisting of olefins and diolefins.

10. A wetting agent consisting essentially of two like nuclear groups of a sulphonated aryl compound of the class consisting of naphthalene and diphenyl linked together by a radical derived from a poly-olefin of at least four carbon atoms.

R. W. MITCHELL.